United States Patent
Suzuki (10) Patent No.: US 6,836,484 B2
(45) Date of Patent: Dec. 28, 2004

(54) WIRELESS PACKET COMMUNICATION METHOD AND SYSTEM FOR TRANSMITTING PACKETS BETWEEN BASE STATION AND RADIO TERMINAL STATION

(75) Inventor: Toshinori Suzuki, Tokyo (JP)

(73) Assignee: DDI Corporation, Tokyo (JP)

( * ) Notice: Subject to any disclaimer, the term of this patent is extended or adjusted under 35 U.S.C. 154(b) by 884 days.

(21) Appl. No.: 09/790,499

(22) Filed: Feb. 23, 2001

(65) Prior Publication Data

US 2001/0024427 A1 Sep. 27, 2001

(30) Foreign Application Priority Data

Feb. 25, 2000 (JP) ........................................ 2000-049344

(51) Int. Cl.$^7$ .................... H04J 3/22; H04J 11/00; H04Q 7/00; H04B 7/00; H04L 1/00
(52) U.S. Cl. ..................... 370/465; 370/208; 370/328; 455/69; 375/281
(58) Field of Search ................................ 370/208, 328, 370/465, 204, 211, 313, 314, 329, 330, 438, 468; 455/69; 375/281

(56) References Cited

U.S. PATENT DOCUMENTS 6,351,499 B1 * 2/2002 Paulraj et al. .............. 375/267
6,400,929 B1 * 6/2002 Ue et al. ...................... 455/69
6,594,320 B1 * 7/2003 Sayeed ........................ 375/281

OTHER PUBLICATIONS

Sadayuki Abeta et al.; Technical Report of IEICE, RCS99–130, Oct. 1999.

* cited by examiner

Primary Examiner—Ricky Ngo
Assistant Examiner—Lee T. Khuong
(74) Attorney, Agent, or Firm—Armstrong, Kratz, Quintos, Hanson & Brooks, LLP (57) ABSTRACT

A wireless packet communication system includes at least one radio terminal station, and a base station for multiplexing packets to be transmitted using a plurality of subcarriers and for sending the multiplexed packets to the at least one radio terminal station. The system has a unit provided in the base station for simultaneously sending reference signals on the subcarriers with the same level to the at least one radio terminal station, a report unit provided in the at least one radio terminal station for reporting to the base station received conditions of the reference signal of each subcarrier or of each subband corresponding to a frequency band occupied by a plurality of subcarriers, and a unit provided in the base station for allocating the subcarrier or the subband to each of the packets to be transmitted depending upon the reported received conditions of the subcarrier or the subband, the allocation being performed in a transmission order of the packets.

22 Claims, 5 Drawing Sheets

Fig. 11

WIRELESS PACKET COMMUNICATION METHOD AND SYSTEM FOR TRANSMITTING PACKETS BETWEEN BASE STATION AND RADIO TERMINAL STATION

FIELD OF THE INVENTION

The present invention relates to a wireless packet communication method and system for transmitting packets between a base station and at least one radio or mobile terminal station.

DESCRIPTION OF THE RELATED ART

A multiple access scheme in a conventional wireless communication system has been realized by a frequency division multiple access (FDMA), a time division multiple access (TDMA), a code division multiple access (CDMA), or a hybrid multiple access combining these multiple accesses.

A plurality of radio channels of divided different frequencies in the FDMA, of divided different time slots in the TDMA and of divided different spread codes in the CDMA are assigned to respective radio terminal stations to carry out the multiple connections, respectively.

At a base station, a frequency band allocated to this base station is in principle equally divided to provide a plurality of carriers. For example, a frequency band of 1 MHz is divided to provide about 40 FDMA/TDMA carriers with an interval of 25 kHz, or a frequency band of 20 MHz is divided to provide 4 CDMA carriers with an interval of 5 MHz.

A carrier frequency of a radio channel allocated to a radio terminal station by a base station is fixed in principle when the radio terminal station is in communication with the same base station. Namely, the same carrier frequency is sequentially used even when instantaneous changes of frequency characteristics in the radio path may occur due to the movement of the radio terminal station.

Conventional wireless packet communication methods using multicarrier transmission will be now described in brief.

The orthogonal frequency division multiplexing (OFDM) scheme that will be utilized in a digital terrestrial broadcasting or a high data rate wireless LAN uses a plurality of subcarriers for sending signals. Each subcarrier will be usually set to a transmission rate considered as a flat fading, such as about 10 ksps at outdoors environment. However, since the OFDM scheme is designed to send a down-link signal to one user by using all subcarriers, transmission efficiency in each radio terminal station will deteriorate due to some subcarriers with poor received conditions.

Performance evaluation of high rate packet transmission using multicarrier CDMA (MC-CDMA) is described in for example Sadayuki Abeta et. al., "Performance comparisons of coherent SC/DS-CDMA, MC/DS-CDMA, MC-CDMA on down-link broadband radio packet transmission", Technical Report of IEICE, RCS99-130, October 1999. According to this MC-CDMA, although each spread spectrum (SS) subcarrier with a wide frequency band is susceptible to frequency selective fading, there is little variation in the receiving state of the subcarrier.

Figure 1:
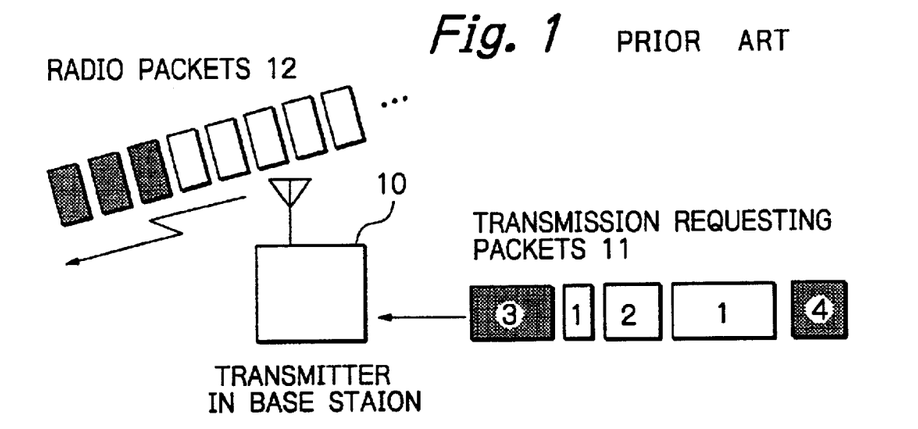
FIG. 1, already described, illustrates a conventional method for sending packets in the order of transmission request.
Figure 2:
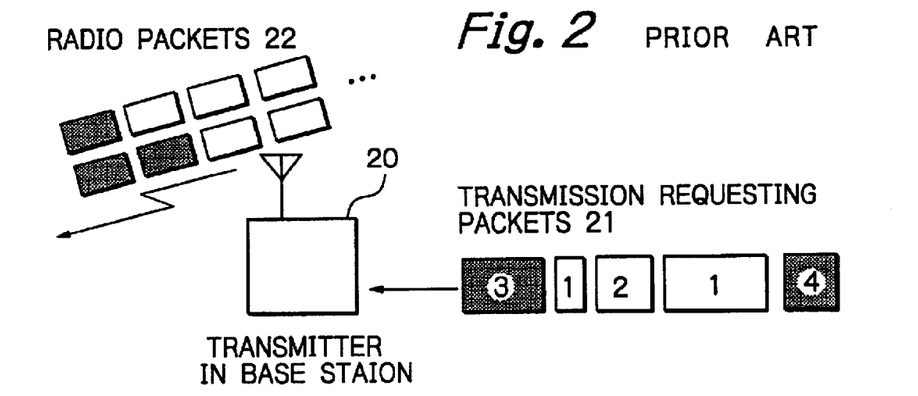
FIG. 2, already described, illustrates a conventional method for multiplexing packets and sending multiplexed packets to a plurality of terminal stations when using SS signals for transmission.

FIGS. 1 and 2 illustrate conventional methods for transmitting radio packets.

Shown in FIG. 1 is the most simple method wherein packets requesting the transmission are sequentially sent in the order of the transmission request. In the figure, reference numeral 10 denotes a base station transmitter, 11 transmission requesting packets, and 12 radio packets sent from the base station. Numerals described in the transmission requesting packets 11 indicate numbers of radio terminal stations to which the packets are to be transmitted. In the example of FIG. 1, the packet to be transmitted to a No. 3 radio terminal station is located at the front-end, and the packet to be transmitted to a No. 4 radio terminal station is located at the tail-end.

The base station sends the radio packets 12 to the respective radio terminal stations without multiplexing. Each radio terminal station judges whether the received radio packet is destined to it or not from the header of the received radio packet. If the destined radio terminal station correctly receives the radio packet, this terminal station acknowledges by returning a response to the base station. The base station may send again the radio packet to the destined terminal station if no acknowledgement (ACK) is received. If it is judged from the ACK information that a good radio channel is established between the radio terminal station and the base station, more effective transmission using the multilevel modulation may be executed with this radio terminal station at the next transmission (adaptive modulation scheme).

However, according to this conventional method of FIG. 1, the base station will assign any subcarrier to a radio terminal station even if it may provide a poor received condition at this radio terminal station. Namely, all the subcarriers including good and bad received condition subcarriers are assigned causing the whole transmission efficiency to decrease.

When using SS signals for transmission, transmission requesting packets are multiplexed and sent in parallel to a plurality of terminal stations as shown in FIG. 2. In the figure, reference numeral 20 denotes a base station transmitter, 21 transmission requesting packets, and 22 radio packets transmitted from the base station.

Since each radio packet 22 is multiplexed by using different spread code, no assignment depending upon the received conditions is executed. In MC-CDMA, since each subcarrier uses a wide frequency band to expect the path diversity effect, the difference of the received conditions of the subcarrier becomes generally small.

According to this conventional method of FIG. 2, since the frequency band of each subcarrier is wide, each subcarrier may include some portions providing poor receiving conditions to the respective radio terminal stations. Therefore, the whole transmission efficiency will be decreased as well as the conventional method of FIG. 1.

SUMMARY OF THE INVENTION

It is therefore an object of the present invention to provide a wireless packet communication method and system, whereby no subcarrier providing poor receiving conditions to a radio terminal station, which causes degradation of transmission efficiency, is assigned to the radio terminal station.

According to the present invention, a wireless packet communication system including at least one radio terminal station, and a base station for multiplexing packets to be transmitted using a plurality of subcarriers and for sending the multiplexed packets to the at least one radio terminal station, has a unit provided in the base station for simultaneously sending reference signals on the subcarriers with the same level to the at least one radio terminal station, a report unit provided in the at least one radio terminal station for reporting to the base station received conditions of the reference signal of each subcarrier or of each subband corresponding to a frequency band occupied by a plurality of subcarriers, and a unit provided in the base station for allocating the subcarrier or the subband to each of the packets to be transmitted depending upon the reported received conditions of the subcarrier or the subband, the allocation being performed in a transmission order of the packets.

Furthermore, according to the present invention, a communication method in a wireless packet communication system including at least one radio terminal station, and a base station for multiplexing packets to be transmitted using a plurality of subcarriers and for sending the multiplexed packets to the at least one radio terminal station has a step of simultaneously sending from the base station reference signals on the subcarriers with the same level to the at least one radio terminal station, a step of reporting from the at least one radio terminal station to the base station received conditions of the reference signal of each subcarrier or of each subband corresponding to a frequency band occupied by a plurality of subcarriers, and a step of allocating in the base station the subcarrier or the subband to each of the packets to be transmitted depending upon the reported received conditions of the subcarrier or the subband, the allocation being performed in a transmission order of the packets.

The subcarriers with strong received intensities at each radio terminal station is assigned to packets to be transmitted and thus the packets are multiplexed. Therefore, according to the present invention, down-link signal transmission with improved frequency efficiency in comparison with the conventional packet transmission which equally uses all the subcarriers can be attained. Also, if the received conditions is reported for every subband that corresponds to a frequency band occupied by a plurality of subcarriers, the amount of information for the report can be reduced.

It is preferred that the subcarriers have a transmission rate similar to a rate of a flat fading.

It is also preferred that the report unit includes a first unit for reporting whether the received conditions of the each subcarrier or the each subband is equal to or higher than a first received condition threshold A or not to the base station. In this case, preferably, the first unit includes a unit for reporting the received conditions of the each subcarrier or the each subband by a binary one bit representing that the received conditions is equal to or higher than the threshold A or the received conditions is lower than the threshold A.

It is preferred that the report unit includes a first unit for reporting whether the received conditions of each subcarrier or each subband is equal to or higher than a first received condition threshold A or not to the base station, and a second unit for reporting identifiers of each subcarrier or each subband having the received conditions equal to or lower than a second received condition threshold B that is lower than the first received condition threshold A to the base station. In this case, preferably the second unit reports the identifiers at a radio terminal station that is a destination of a first packet of the packets, and the first unit reports the received conditions in radio terminal stations that are destinations of second and following packets of the packets.

It is also preferred that the report unit includes a first unit for reporting whether the received conditions of each subcarrier or each subband is equal to or higher than a first received condition threshold A or not to the base station, and a third unit for reporting identifiers of each subcarrier or each subband having the received conditions equal to or higher than a third received condition threshold C that is higher than the first received condition threshold A to the base station.

In this case, it is also preferred that the first unit reports the received conditions in a radio terminal station that is a destination of a first packet of the packets, and the third unit reports the identifiers at radio terminal stations that are destinations of second and following packets of the packets.

It is further preferred that the report unit includes a variation report unit for reporting only variations in received conditions at each subcarrier or each subband to the base station. The received conditions will be represented in multi-state expressions. In this case, preferably, the variations in received conditions is represented by binary bits.

It is preferred that the variation report unit includes a unit for reporting that there is large variations to the base station when the variations in received conditions is larger than a predetermined level. Thus, amount of information to be reported can be reduced.

Further objects and advantages of the present invention will be apparent from the following description of the preferred embodiments of the invention as illustrated in the accompanying drawings.

DESCRIPTION OF THE PREFERRED EMBODIMENTS

Figure 3:
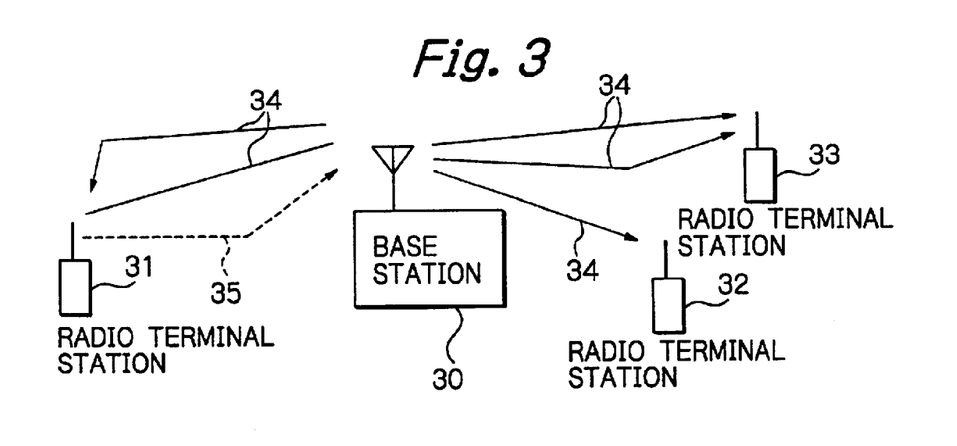
FIG. 3 is a view schematically illustrating system configuration of a preferred embodiment of a wireless communication system according to the present invention.

FIG. 3 schematically illustrates system configuration of a preferred embodiment of a wireless communication system according to the present invention.

This system includes a base station 30, and one or more radio terminal stations such as mobile stations 31, 32 and 33 for communicating with the base station 30 by multiplexing packets using a plurality of subcarriers. In the figure, solid lines with arrows 34 indicate down-link signals (signals from the base station to the radio terminal station) and a broken line with an arrow 35 indicates up-link signal (signal from the radio terminal station to the base station).

The base station 30 assigns subcarriers to the respective radio terminal stations 31, 32 and 33 base upon reports of the received intensity provided from these stations 31, 32 and 33 and upon sending traffics to these respective stations 31, 32 and 33.

In the following description, it is assumed that one subcarrier is assigned only to one radio terminal station. In case of using spread spectrum subcarrier, however, one subcarrier may be assigned to a plurality of radio terminal stations.

If the frequency band occupied by each subcarrier has a frequency selectivity, it is desired to make narrow the frequency band so that the frequency selectivity becomes negligible. That is, it is desired to narrow the bandwidth of the subcarrier to substantially the coherent bandwidth or less.

Figure 4:
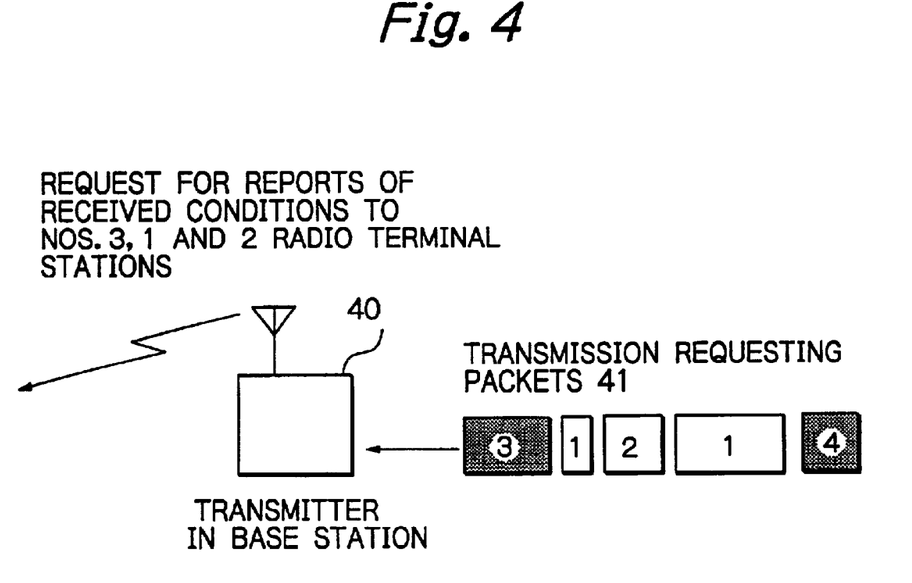
FIG. 4 illustrates the order of arrival of the transmission requesting packets at the base station.

Assuming that transmission requesting packets 41 are arrived at a transmitter 40 in the base station in the order shown in FIG. 4. Numerals described in the transmission requesting packets 41 indicate numbers of radio terminal stations to which the packets are to be transmitted. In the example of FIG. 4, the packet to be transmitted to a No. 3 radio terminal station is located at the front-end, and the packet to be transmitted to a No. 4 radio terminal station is located at the tail-end.

The base station requests reports of received conditions to several radio terminal stations that correspond to destinations of several packets from the top packet. In this case, received condition reports are requested to the No. 3 radio terminal station, the No. 1 radio terminal station and the No. 2 radio terminal station in this order corresponding to the three packets from the top.

Figure 5:
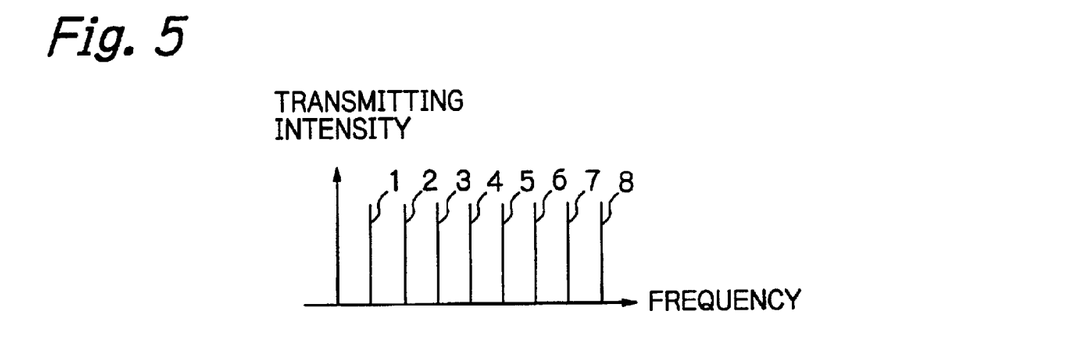
FIG. 5 is a graph of transmitting intensity versus frequency of reference signals sent from the base station.

The base station intermittently or sequentially sends reference signals used to measure the received conditions at the radio terminal stations by carrying them on the subcarriers for requesting the received condition reports. Each reference signal may be a signal formed by modulating transmitting data or a pilot signal with a known pattern. FIG. 5 illustrates that the reference signals on eight subcarriers are simultaneously sent from the base station with an equal transmitting intensity.

The down-link signal under the wide band transmission will have, due to its frequency sensitivity, strongly receivable frequency band within which the received intensity will be high, and have another frequency band within which the received intensity will not so high. This frequency sensitivity of the signal depends on the conditions of transmission path between the base station and the radio terminal station.

Figure 6A:
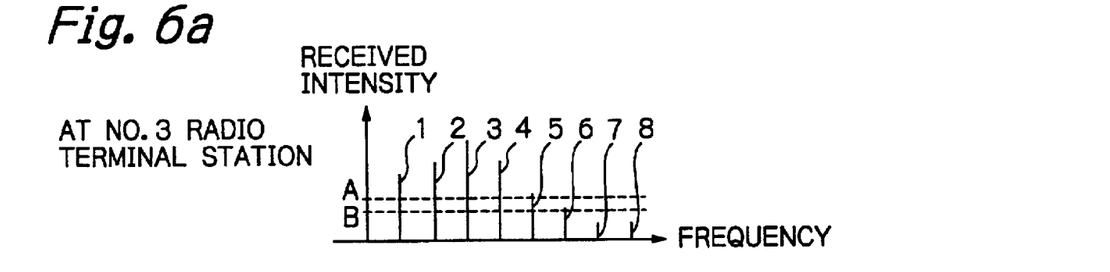
FIGS. 6a to 6c are graphs of received intensity versus frequency of the reference signals shown in FIG. 5 at three radio terminal stations, respectively.
Figure 6B:
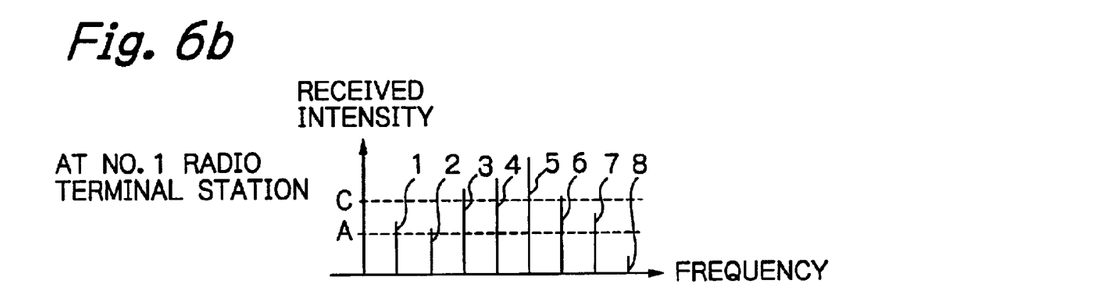
Figure 6C:
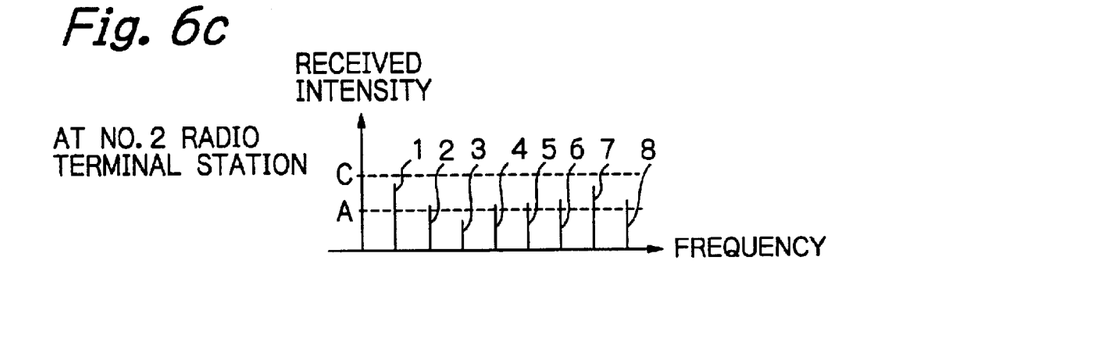

The received intensities of the reference signals of FIG. 5 at the three radio terminal stations are indicated in FIGS. 6a to 6c, respectively. As shown in FIG. 6a, the received intensity of and near the third subcarrier is high at the No. 3 radio terminal station. As shown in FIG. 6b, the received intensity of and near the fifth subcarrier is high at the No. 1 radio terminal station. As shown in FIG. 6c, the received intensity of the first and seventh subcarriers is high and the same level at the No. 2 radio terminal station.

Several examples of method for reporting the received conditions executed at the radio terminal station and method for allocating subcarriers executed at the base station will be now described.

FIRST EXAMPLE

All the radio terminal stations report whether the received intensity of each subcarrier is equal to or higher than a received condition threshold A or not to the base station. The threshold A is determined to a level at and above which high quality radio transmission can be sufficiently attained.

Table 1 indicates an example of this report from the radio terminal stations. In the Table, a mark ○ indicates a report that the received intensity of the subcarrier is equal to or higher than the threshold A, and a mark X indicates a report that the received intensity of the subcarrier is lower than the threshold A.

TABLE 1

| Subcarrier Numbers | | 1 | 2 | 3 | 4 | 5 | 6 | 7 | 8 |
|---|---|---|---|---|---|---|---|---|---|
| | Threshold | | | | Received conditions | | | | |
| No. 3 radio terminal station | A | ○ | ○ | ○ | ○ | ○ | X | X | X |
| No. 1 radio terminal station | A | ○ | ○ | ○ | ○ | ○ | ○ | ○ | X |
| No. 2 radio terminal station | A | ○ | ○ | X | ○ | ○ | ○ | ○ | ○ |

Figure 7:
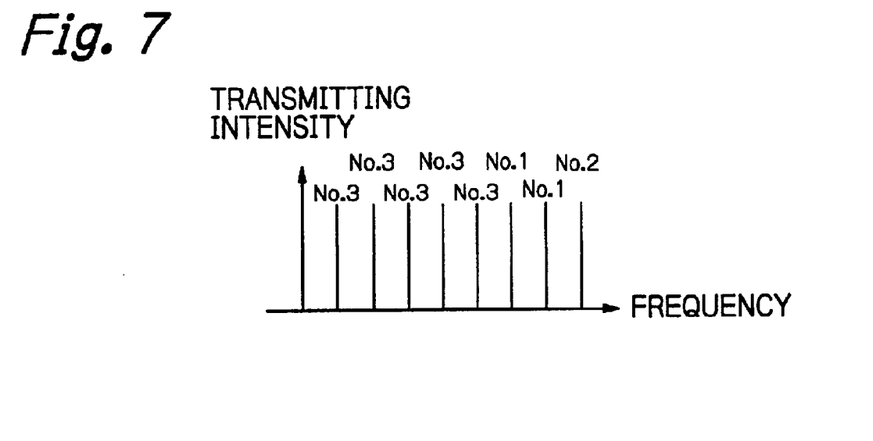
FIG. 7 illustrates subcarrier allocation in a first example.

The subcarrier allocation executed at the base station starts from the No. 3 radio terminal station that is the destination of the top packet. To this No. 3 radio terminal station, the subcarriers 1 to 5 with high received intensities at this No. 3 radio terminal station are assigned. Then, to the No. 1 radio terminal station that is the destination of the second packet, the remained subcarriers 6 and 7 with high received intensities at this No. 1 radio terminal station are assigned. Thereafter, to the No. 2 radio terminal station that is the destination of the third packet, the remained subcarrier 8 with high received intensity at this No. 2 radio terminal station is assigned. The result of this subcarrier allocation is shown in FIG. 7. As will be noted, in this first example, the three packets to be transmitted are sequentially multiplexed in the above-mentioned order in consideration of the received conditions of the subcarriers.

SECOND EXAMPLE

In this example, the No. 3 radio terminal station that is the destination of the top packet reports to the base station reference numbers of subcarriers whose received intensities are equal to or lower than a low threshold B. This low threshold B is determined to a level so that this level is lower than the threshold A and that at and below this level, poor quality radio transmission will be obtained. The Nos. 1 and 2 radio terminal stations report whether the received intensity of each subcarrier is higher than a received condition threshold A or not to the base station.

Table 2 indicates an example of this report from the radio terminal stations. In the Table, a mark ○ indicates a report that the received intensity of the subcarrier is equal to or higher than the threshold A, and a mark X indicates a report that the received intensity of the subcarrier is lower than the threshold B or that the received intensity of the subcarrier is lower than the threshold A.

TABLE 2

| Subcarrier Numbers | | 1 | 2 | 3 | 4 | 5 | 6 | 7 | 8 |
|---|---|---|---|---|---|---|---|---|---|
| | Threshold | | | | Received conditions | | | | |
| No. 3 radio terminal station | B | — | — | — | — | — | — | X | X |

TABLE 2-continued

| Subcarrier Numbers | Threshold | 1 | 2 | 3 | 4 | 5 | 6 | 7 | 8 |
|---|---|---|---|---|---|---|---|---|---|
| | | | | | Received conditions | | | | |
| No. 1 radio terminal station | A | ○ | ○ | ○ | ○ | ○ | ○ | ○ | X |
| No. 2 radio terminal station | A | ○ | ○ | X | ○ | ○ | ○ | ○ | ○ |

Figure 8:
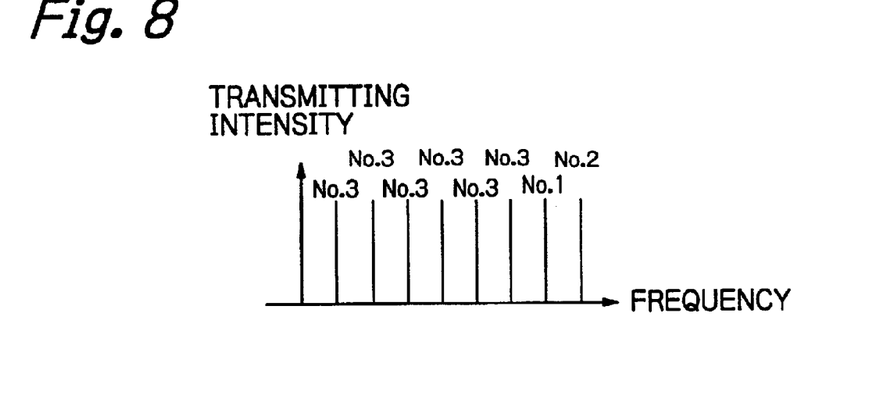
FIG. 8 illustrates subcarrier allocation in a second example.

At the No. 3 radio terminal station, the subcarriers 7 and 8 have received intensities lower than the threshold B. Thus, from the No. 3 radio terminal station, only identifiers such as numbers of 7 and 8 of these subcarriers are reported to the base station. Thus, the base station assigns the subcarriers 1 to 6 which have received intensities higher than the threshold B to this No. 3 radio terminal station. Then, to the No. 1 radio terminal station that is the destination of the second packet, the remained subcarrier 7 with a high received intensity at this No. 1 radio terminal station is assigned. Thereafter, to the No. 2 radio terminal station that is the destination of the third packet, the remained subcarrier 8 with high received intensity at this No. 2 radio terminal station is assigned. The result of this subcarrier allocation is shown in FIG. 8.

The received condition report from the No. 3 radio terminal station needs 8 bits in the first example, whereas 6 bits (3 bits for each of two subcarrier numbers) in this second example. Thus, this second example can reduce the sending amount of the report from the radio terminal station. Namely, according to this second example, since the top packet is multiplexed with higher priority by using the two thresholds A and B, transmission delay of the top packet can be reduced. In addition, according to this second example, since it is supposed that there will be a few subcarriers equal to or lower than the low threshold B, the sending amount of the received condition report from the radio terminal station can be reduced.

THIRD EXAMPLE

In this example, the Nos. 1 and 2 radio terminal stations that are the destinations of the second and third packets report to the base station reference numbers of subcarriers whose received intensities are equal to or higher than a threshold C. The threshold B is determined to a level higher than the threshold A. The No. 3 radio terminal station that is the destination of the top packet reports whether the received intensity of each subcarrier is equal to or higher than the threshold A or not to the base station as well as in the first example.

Table 3 indicates an example of this report from the radio terminal stations. In the Table, a mark ○ indicates a report that the received intensity of the subcarrier is equal to or higher than the threshold A or that the received intensity of the subcarrier is equal to or higher than the threshold C, and a mark X indicates a report that the received intensity of the subcarrier is lower-than the threshold A.

TABLE 3

| Subcarrier Numbers | Threshold | 1 | 2 | 3 | 4 | 5 | 6 | 7 | 8 |
|---|---|---|---|---|---|---|---|---|---|
| | | | | | Received conditions | | | | |
| No. 3 radio terminal station | A | ○ | ○ | ○ | ○ | ○ | X | X | X |
| No. 1 radio terminal station | C | — | — | ○ | ○ | ○ | ○ | — | — |
| No. 2 radio terminal station | C | — | — | — | — | — | — | — | — |

Figure 9:
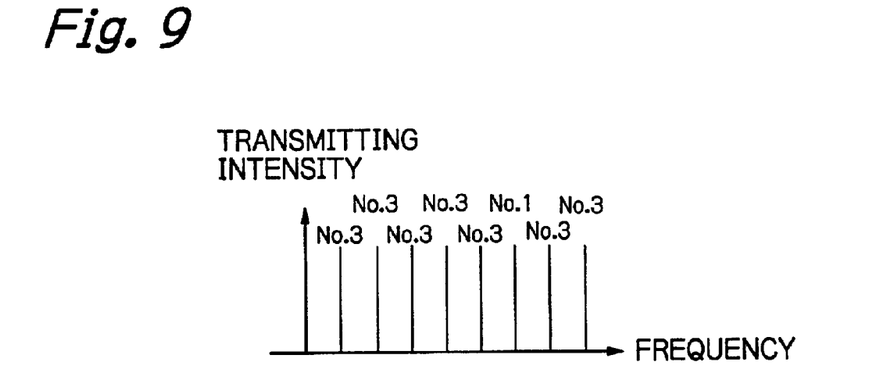
FIG. 9 illustrates subcarrier allocation in a third example.

The subcarrier allocation executed at the base station starts from the No. 3 radio terminal station that is the destination of the top packet. To this No. 3 radio terminal station, the subcarriers 1 to 5 with high received intensities at this No. 3 radio terminal station are assigned.

At the No. 1 radio terminal station that is the destination of the second packet, the subcarriers 3 to 6 have received intensities equal to or higher than the threshold C. Thus, from the No. 1 radio terminal station, only identifiers such as numbers of 3 to 6 of these subcarriers are reported to the base station. Then, to the No. 1 radio terminal station, the remained subcarrier 6 with high received intensity at this No. 1 radio terminal station is assigned. To the No. 2 radio terminal station that is the destination of the third packet, no subcarrier is assigned because there is no subcarrier with the received intensity equal to or higher than the threshold C. The remained subcarriers 7 and 8 are assigned to the. No. 3 radio terminal station. The result of this subcarrier allocation is shown in FIG. 9.

According to this third example, since the top packet is multiplexed with higher priority by using the two thresholds A and C, transmission delay of the top packet can be reduced. In addition, according to this third example, since it is supposed that there will be a few subcarriers equal to or higher than the threshold C, the sending amount of the received condition report from the radio terminal stations can be reduced. For example, the received condition reports from the Nos. 3 and 2 radio terminal stations need 16 bits in the first example, whereas 12 bits in this third example.

In the aforementioned first to third examples, the received conditions are reported by binary state expressions of ○ or X that is the result of comparison of the received intensities with a single threshold level such as A, B or C. However, according to the present invention, the received conditions may be reported by using expressions of multi-state larger than binary state. In the latter case, although the amount of information for the report increases, more efficient subcarrier allocation can be expected.

In order to notify the allocation result from the base station to the radio terminal stations, a broadcast control channel is used. The broadcast control channel may be a part of or all the above-mentioned subcarriers using time-division or code-division manner, or another channel. At each radio terminal station, the allocation result information is received and then subcarrier channels assigned to this station are demodulated to obtain desired signals.

FOURTH EXAMPLE

Depending upon size of the packet to be transmitted, a plurality of radio packets should be continuously sent. Since the received conditions at the moving radio terminal station will change over time, the radio terminal station to which the radio packets are continuously sent should periodically report the received conditions to the base station.

Contrary to this, at the radio terminal station moving a little, since the received conditions will not so change over time, the amount of information for the received condition report can be reduced by notifying only the changed amount of received conditions or the differences between the instant received conditions and the last reported received conditions.

Figure 10A:
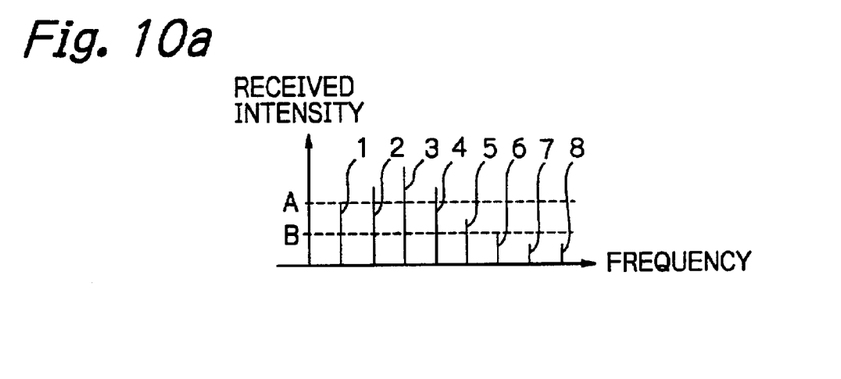
FIGS. 10a and 10b are graphs of received intensity versus frequency of a reference signal at two different time in a fourth example.
Figure 10B:
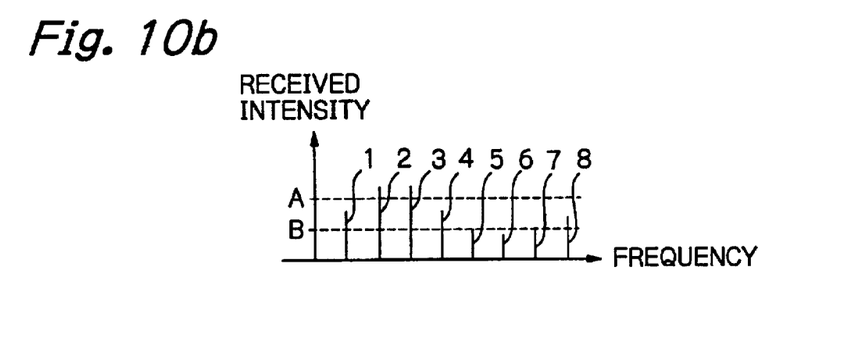

FIG. 10a indicates the received intensities of subcarriers at a certain radio terminal station at a reporting time, and FIG. 10b indicates the received intensities of subcarriers at the same radio terminal station at the next reporting time. If the received intensities are represented by three state of "0", "1" and "2", the reported contents will be shown as Tables 4 and 5. Table 5 indicates the changed amount of the received intensities or the differences between the received intensities shown in FIGS. 10a and 10b.

TABLE 4

| Subcarrier Numbers | 1 | 2 | 3 | 4 | 5 | 6 | 7 | 8 |
|---|---|---|---|---|---|---|---|---|
| Received Intensities at a Reporting Time | 1 | 2 | 2 | 2 | 1 | 0 | 0 | 0 |

TABLE 5

| Subcarrier Numbers | 1 | 2 | 3 | 4 | 5 | 6 | 7 | 8 |
|---|---|---|---|---|---|---|---|---|
| Received Intensities at the Next Reporting Time | 1 | 2 | 2 | 1 | 1 | 0 | 0 | 1 |
| Difference Between The Reporting Times | 0 | 0 | 0 | −1 | 0 | 0 | 0 | +1 |

For reporting the received conditions of eight subcarriers by three state expressions, amount of information of 8×log$_2$(3)=12.7 bits is necessary. Whereas in this fourth example, the changed amount of received conditions are encoded as, for example, "00" in case of no change, "10" in case of plus change and "11" in case of minus change. If the changed amount of received conditions are thus encoded, the received conditions shown in Table 5 can be sent by 10 bits (twice of (3 bits of subcarrier number plus 2 bits of its changed amount)). Therefore, amount of information for the received condition report can be reduced.

In order to further reduce the amount of information, it is effective to report as "no variation" without notifying the individual received conditions when variations in received conditions is a predetermined level or less. The variations in received conditions may be represented by for example an average over one subcarrier, of the sum of absolute values of the changed amount of the received conditions or of the sum of absolute values of the difference between the reporting times in Table 5, or by correlation between the received intensity waves shown in FIGS. 10a and 10b.

In case of large variations in received conditions, such scheme for reducing the amount of information for the received condition report will not be so effective. In such case, if the variations in received conditions is always larger than a predetermined level, it is effective to report as "large variation" for reducing the amount of information. Since all the subcarriers will greatly vary in such case, time-averaged received conditions will be substantially the same in all the subcarriers. Thus, any subcarrier can be optionally assigned. It is noted that this scheme for reducing the amount of information can be applicable to not only the sequentially executed reports of the received conditions but also the first report of the received conditions.

In the aforementioned first to fourth examples, the received conditions is reported for every subcarrier. However, in modifications, the received conditions may be reported for every subband that is a frequency band containing a plurality of subcarriers to reduce the amount of information for the report. The received conditions in subband may be averaged or typical received conditions determined from the received conditions of one or more subcarriers in that subband.

Figure 11:
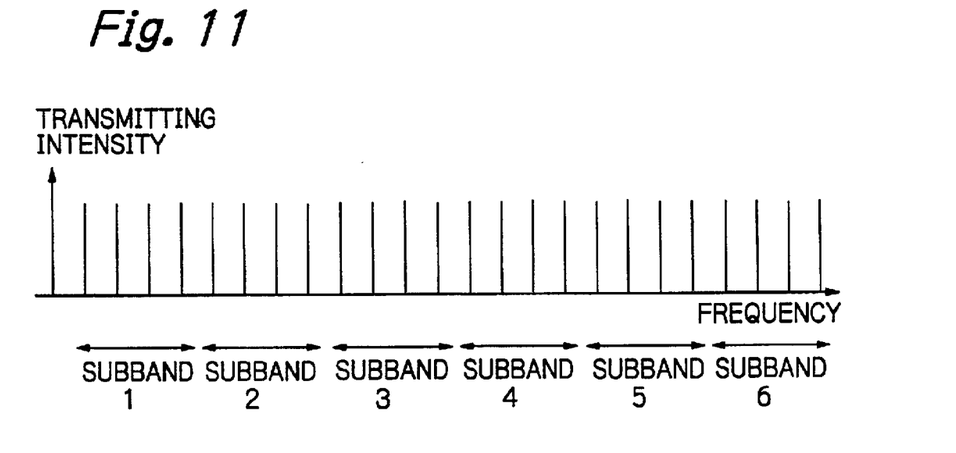
FIG. 11 illustrates subband allocation in a modification.

FIG. 11 illustrates a subband allocation scheme. In this case, there are 24 subcarriers and 6 subbands each including 4 subcarriers are formed. Thus, in this case, the amount of information to be reported is reduced to one fourth.

If a bandwidth of each subband is substantially the coherent bandwidth or less, the received condition report of every subband produces no problem. The allocation of subcarriers will be executed for every subband in this case.

If the bandwidth of each subband is wider than the coherent bandwidth, the received conditions of individual subcarriers or of the coherent bandwidth is complementally presumed from the received conditions of two or more adjoining subbands to perform the allocation with high frequency efficiency.

Many widely different embodiments of the present invention may be constructed without departing from the spirit and scope of the present invention. It should be understood that the present invention is not limited to the specific embodiments described in the specification, except as defined in the appended claims.

What is claimed is:

1. A wireless packet communication system including at least one radio terminal station, and a base station for multiplexing packets to be transmitted using a plurality of subcarriers and for sending the multiplexed packets to said at least one radio terminal station, said system comprising:

means provided in said base station for simultaneously sending reference signals on said subcarriers with the same level to said at least one radio terminal station;

report means provided in said at least one radio terminal station for reporting to said base station received conditions of the reference signal of each subcarrier or of each subband corresponding to a frequency band occupied by a plurality of subcarriers; and means provided in said base station for allocating the subcarrier or the subband to each of said packets to be transmitted depending upon the reported received conditions of said subcarrier or said subband, said allocation being performed in a transmission order of said packets.

2. The system as claimed in claim 1, wherein said subcarriers have a transmission rate similar to a rate of a flat fading.

3. The system as claimed in claim 1, wherein said report means comprises first means for reporting whether the received conditions of said each subcarrier or said each subband is equal to or higher than a first received condition threshold A or not to said base station.

4. The system as claimed in claim 3, wherein said first means comprises means for reporting the received conditions of said each subcarrier or said each subband by a binary one bit representing that the received conditions is equal to or higher than said threshold A or the received conditions is lower than said threshold A.

5. The system as claimed in claim 1, wherein said report means comprises first means for reporting whether the received conditions of each subcarrier or each subband is equal to or higher than a first received condition threshold A or not to said base station, and second means for reporting identifiers of each subcarrier or each subband having the received conditions equal to or lower than a second received condition threshold B that is lower than said first received condition threshold A to said base station.

6. The system as claimed in claim 5, wherein said second means reports the identifiers at a radio terminal station that is a destination of a first packet of said packets, and said first means reports the received conditions in radio terminal stations that are destinations of second and following packets of said packets.

7. The system as claimed in claim 1, wherein said report means comprises first means for reporting whether the received conditions of each subcarrier or each subband is equal to or higher than a first received condition threshold A or not to said base station, and third means for reporting identifiers of each subcarrier or each subband having the received conditions equal to or higher than a third received condition threshold C that is higher than said first received condition threshold A to said base station.

8. The system as claimed in claim 7, wherein said first means reports the received conditions in a radio terminal station that is a destination of a first packet of said packets, and said third means reports the identifiers at radio terminal stations that are destinations of second and following packets of said packets.

9. The system as claimed in claim 1, wherein said report means comprises variation report means for reporting only variations in received conditions at each subcarrier or each subband to said base station, said received conditions being represented in multi-state expressions.

10. The system as claimed in claim 9, wherein said variations in received conditions is represented by binary bits.

11. The system as claimed in claim 9, wherein said variation report means comprises means for reporting that there is large variations to said base station when the variations in received conditions is larger than a predetermined level.

12. A communication method in a wireless packet communication system including at least one radio terminal station, and a base station for multiplexing packets to be transmitted using a plurality of subcarriers and for sending the multiplexed packets to said at least one radio terminal station, said method comprising the steps of:

simultaneously sending from said base station reference signals on said subcarriers with the same level to said at least one radio terminal station;

reporting from said at least one radio terminal station to said base station received conditions of the reference signal of each subcarrier or of each subband corresponding to a frequency band occupied by a plurality of subcarriers; and allocating in said base station the subcarrier or the subband to each of said packets to be transmitted depending upon the reported received conditions of said subcarrier or said subband, said allocation being performed in a transmission order of said packets.

13. The method as claimed in claim 12, wherein said subcarriers have a transmission rate similar to a rate of a flat fading.

14. The method as claimed in claim 12, wherein said report step comprises first step of reporting whether the received conditions of said each subcarrier or said each subband is equal to or higher than a first received condition threshold A or not to said base station.

15. The method as claimed in claim 14, wherein said first step comprises reporting the received conditions of said each subcarrier or said each subband by a binary one bit representing that the received conditions is equal to or higher than said threshold A or the received conditions is lower than said threshold A.

16. The method as claimed in claim 12, wherein said reporting step comprises first step of reporting whether the received conditions of each subcarrier or each subband is equal to or higher than a first received condition threshold A or not to said base station, and second step of reporting identifiers of each subcarrier or each subband having the received conditions equal to or lower than a second received condition threshold B that is lower than said first received condition threshold A to said base station.

17. The method claimed in claim 16, wherein said second step comprises reporting the identifiers at a radio terminal station that is a destination of a first packet of said packets, and said first step reports the received conditions in radio terminal stations that are destinations of second and following packets of said packets.

18. The method as claimed in claim 12, wherein said report step comprises first step of reporting whether the received conditions of each subcarrier or each subband is equal to or higher than a first received condition threshold A or not to said base station, and third step of reporting identifiers of each subcarrier or each subband having the received conditions equal to or higher than a third received condition threshold C that is higher than said first received condition threshold A to said base station.

19. The method as claimed in claim 18, wherein said first step comprises reporting the received conditions in a radio terminal station that is a destination of a first packet of said packets, and said third step comprises reporting the identifiers at radio terminal stations that are destinations of second and following packets of said packets.

20. The method as claimed in claim 12, wherein said reporting step comprises variation reporting step of reporting only variations in received conditions at each subcarrier or each subband to said base station, said received conditions being represented in multi-state expressions.

21. The method as claimed in claim 20, wherein said variations in received conditions is represented by binary bits.

22. The method as claimed in claim 20, wherein said variation reporting step comprises reporting that there is large variations to said base station when the variations in received conditions is larger than a predetermined level.

* * * * *